March 19, 1929.　　　　G. O. BLAIR　　　　1,705,895

HOSE CLAMP

Filed Feb. 18, 1928

Inventor
George O. Blair.
By A. J. O'Brien
Attorney

Patented Mar. 19, 1929.

1,705,895

UNITED STATES PATENT OFFICE.

GEORGE O. BLAIR, OF DENVER, COLORADO.

HOSE CLAMP.

Application filed February 18, 1928. Serial No. 255,376.

This invention relates to improvements in hose clamps of the type employed for securing a rubber hose to a tubular projection and is especially well adapted for use in connection with automobile radiators which must be connected to the engine by means of conduits comprising sections of hose that will yield so as to permit slight relative movement between the radiator and the engine. It is the object of this invention to produce a hose clamp that shall be so constructed that it can be cheaply manufactured and which will require no hand labor in its production. It is another object of this invention to produce a hose clamp that can be very easily applied and tightened and which can also be readily removed when occasion requires. A still further object of this invention is to produce a hose clamp that shall be slightly resilient so that it will yield in a longitudinal direction and which will therefore compensate for the gradual compression of the hose material.

In order to describe my invention so that it can be readily understood, reference will be had to the accompanying drawing in which the preferred embodiment thereof has been illustrated, and in which.

Figure 1:
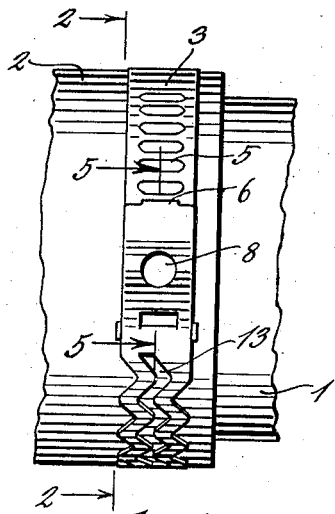
Fig. 1 is a side elevation showing one end of a hose secured to a tubular member by means of my improved clamp.
Figure 2:
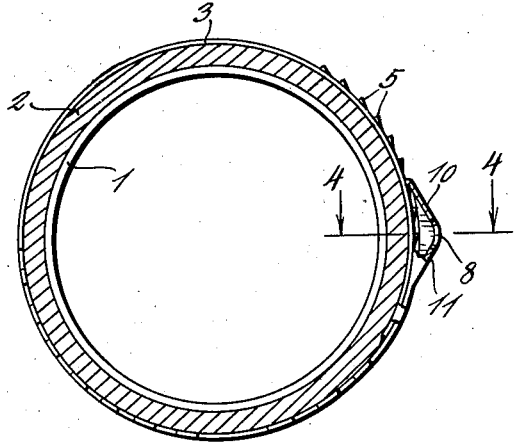
Fig. 2 is a section taken on line 2—2, Fig. 1, with a part of my clamp broken away to better disclose the construction.
Figure 5:
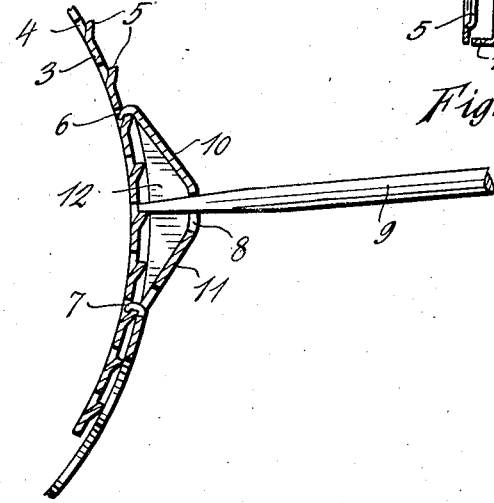
Fig. 5 is a section taken on line 5—5, Fig. 1.

In the drawing numeral 1 represents a metal tubular member to which the hose 2 is to be clamped. In the example illustrated, the diameter of tubular member 1 is shown as of the usual diameter employed in hose connections for an internal combustion engine, but I want it distinctly understood that my hose clamp is suitable and can be used with hose connections of any diameter. It is customary to employ a metal band whose ends are provided with openings for the reception of a stove bolt and which band can be tightened about the end of the hose so as to force it against the outer surface of the tubular member. My improved clamp consists of a metal strip 3 of a length somewhat greater than the circumference of the hose to which it is to be applied. One end of this strip is provided with a plurality of transverse cuts 4 the material between which has been pressed outwardly so as to form ratchet teeth 5 in the manner shown in Figs. 2 and 5. The other end of the strip is provided with a hook 6 that is bent inwardly and adapted to engage the edges of the teeth 5 in the manner shown in Fig. 5. This end of the strip is preferably provided with a second hook 7 which is spaced a short distance from the end. The material between hooks 6 and 7 is pressed outwardly in the manner shown in Fig. 5, so that the inner surface of the material between hooks 6 and 7 will be spaced a short distance from the outer surface of the end provided with the ratchet teeth. The part between hooks 6 and 7 is provided with an opening 8 through which a screw driver or other similar tool 9 can be inserted. The inner end of this tool is placed against the edge of one of the ratchet teeth 5 and used as a lever for the purpose of tensioning the band; when the proper tension has been obtained, hooks 6 and 7 are permitted to engage corresponding teeth 5 so that when the tool 9 is removed the parts will remain in tensioned position in a manner quite obvious from Fig. 5. In order to strengthen the outwardly curved portion that lies between hooks 6 and 7, the inclined sides 10 and 11 are connected by end flanges 12 which can be formed, when the metal band is cut from the stock, by means of properly constructed dies.

Figure 3:
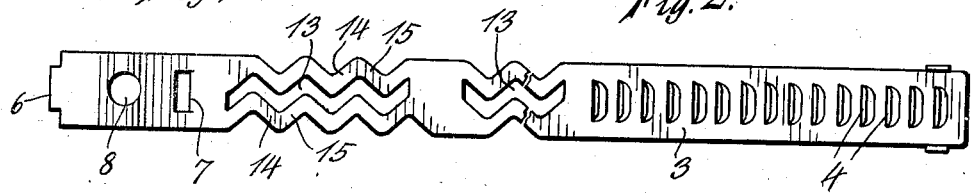
Fig. 3 is a view of the hose clamp showing the same as it appears when it comes from the punch press.
Figure 4:
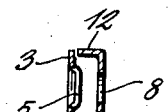
Fig. 4 is a section taken on line 4—4, Fig. 2.
Figure 6:
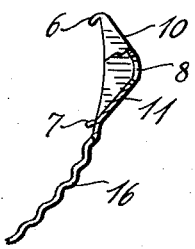
Fig. 6 is a fragmentary view partly in section showing a slightly modified construction.

It is well known that when clamps are put into place about new hose connections, that the continued pressure exerted by the clamp will compress the material of the hose so that the pressure will be relieved sufficiently to result in leaks between the hose and the tubular member. In order to prevent leaks from occurring from this cause, I have constructed my clamp in such a way that it will be slightly resilient in a longitudinal direction and therefore it will contract as the material of the hose compresses, thereby maintaining a water tight connection at all times. In order to secure this resiliency, I have provided the metal band from which the clamp is constructed with two or more slots 13 that are cut zigzag in a manner shown quite clearly in Fig. 3. The outer edges of the strap is also cut zigzag to correspond with the openings and in this manner strips of metal are attained which consist of angularly related sides 14 and 15 that will bend slightly when sufficient tension is exerted, and as the material is resilient these angularly related sections act as springs that serve to contract the length of the strap as the material of the hose compresses and therefore to compensate for the change in the length of the circumference of the hose and thereby to maintain a water tight unit at all times. In Fig. 6 I have shown how this longitudinal resiliency can be obtained in a slightly different manner. Instead of the zigzag sections 14 and 15, the end of the strap has been transversely corrugated in the manner indicated by numeral 16. These corrugations extend only a short distance from hook 7 and when the strap is tensioned by means of the tool 9, it will yield slightly along this corrugated section and the action of these corrugations will serve to contract the clamp so as to compensate for the shrinkage of the material in the hose. Attention is called to the fact that hose 8 is made round so that a screw driver may be rotated in this opening. This makes it possible to tighten the clamp in places where the ordinary lever action could not be had owing to lack of space.

From the above description it will be apparent that I have produced a hose clamp of a very simple and substantial construction which can be formed complete in one operation by means of proper cutting and forming dies and which can be readily applied and tightened. My improved hose clamp is also constructed in such a way that it will yield in the direction of its length and have a spring action which serves to maintain the tension after the material of the hose has been compressed in the manner above pointed out.

Having described the invention what is claimed as new is:

1. A hose clamp comprising a metal strip bent into a substantially circular form and having its ends overlapping the inside end having a plurality of spaced notches, the outside end having a hook extending inwardly and adapted to engage in said notches, the end having the hook having a portion of its inner surface spaced a short distance from the outer surface of the end having the notches, said spaced portion having an opening.

2. A hose clamp consisting of a metal strip bent into a substantially circular form and having its ends overlapping, the inside end having a plurality of spaced outwardly projecting ratchet teeth, the other end having two inwardly extending spaced hooks adapted to engage the ratchet teeth, the material between the hooks being curved outwardly and provided with an opening through which a tool may be inserted for the purpose of moving the hooks from one ratchet tooth to another.

3. A hose clamp comprising a metal strip bent into a substantially circular form and having its ends overlapping the inside end having a plurality of spaced notches, the outside end having a hook extending inwardly and adapted to engage in said notches, the end having the hook having a portion of its inner surface spaced a short distance from the outer surface of the end having the notches, said spaced portion having an opening, the spaced portions having integral inwardly extending flanges.

In testimony whereof I affix my signature.

GEORGE O. BLAIR.